United States Patent [19]

Winter et al.

[11] Patent Number: 4,711,388

[45] Date of Patent: Dec. 8, 1987

[54] PROCESS AND APPARATUS FOR FABRICATING OPTICAL FIBER CABLES

[75] Inventors: Joseph Winter, New Haven; Michael J. Pryor, Woodbridge, both of Conn.

[73] Assignee: Olin Corporation, New Haven, Conn.

[21] Appl. No.: 736,169

[22] Filed: May 20, 1985

Related U.S. Application Data

[63] Continuation of Ser. No. 497,535, May 24, 1983, Pat. No. 4,555,054, which is a continuation-in-part of Ser. No. 413,846, Sep. 1, 1982, Pat. No. 4,508,423, which is a continuation-in-part of Ser. No. 324,242, Nov. 23, 1981, abandoned.

[51] Int. Cl.$^4$ .............................................. H04B 9/00
[52] U.S. Cl. ..................................... 228/148; 228/222; 350/96.23
[58] Field of Search ................... 228/148, 125, 222; 118/405, 410; 427/434.7; 350/96.23

[56] References Cited

U.S. PATENT DOCUMENTS

| | | | |
|---|---|---|---|
| 1,531,730 | 3/1925 | Bundy | 228/40 |
| 1,605,326 | 11/1926 | Bundy | 118/125 |
| 2,382,868 | 8/1945 | Fink | 118/405 |
| 2,683,099 | 7/1954 | Hahn | 228/42 X |
| 2,975,087 | 3/1961 | Donald | 228/125 |
| 3,008,201 | 11/1961 | Carreker | 164/423 X |
| 3,164,896 | 1/1965 | Fullman | 228/40 X |
| 3,167,857 | 2/1965 | Saito et al. | 228/125 |
| 3,190,528 | 6/1965 | Sillars | 228/43 |
| 3,733,225 | 5/1973 | Moody | 156/48 |
| 3,880,117 | 4/1975 | Stroszynski | 118/410 |
| 4,143,942 | 3/1979 | Anderson | 350/96.23 |

(List continued on next page.)

FOREIGN PATENT DOCUMENTS

| | | | |
|---|---|---|---|
| 946481 | 4/1974 | Canada | 228/148 |
| 0032761 | 7/1981 | European Pat. Off. | |
| 0050495 | 4/1982 | European Pat. Off. | |
| 2507648 | 2/1976 | Fed. Rep. of Germany | |
| 2743260 | 4/1979 | Fed. Rep. of Germany | |
| 2929968 | 2/1981 | Fed. Rep. of Germany | |
| 3141636 | 11/1983 | Fed. Rep. of Germany | |
| 255107 | 1/1949 | Sweden | |
| 2010528 | 6/1979 | United Kingdom | |
| 1583520 | 1/1981 | United Kingdom | |

OTHER PUBLICATIONS

U.S. Ser. No. 497,546, filed May 24, 1983, to Winter et al. (C-I-P of Ser. No. 272,154).

(List continued on next page.)

Primary Examiner—Kenneth J. Ramsey
Attorney, Agent, or Firm—Paul Weinstein

[57] ABSTRACT

A process and apparatus for fabricating an optical fiber communication cable are described herein. The optical fiber cable has a cable core including a metal containment tube and at least one optical fiber within the tube. The containment tube preferably is formed by drawing a strip of metal through at least one forming die. In a first aspect of the present invention, smooth operation of the forming die is promoted by first passing the metal strip through a shaving die to remove any shearing burrs along the strip edges and to maintain the width of the strip within a desired tolerance.

In a second aspect of the present invention, various approaches for effectively sealing the containment tube are described. In a first embodiment, the tube is sealed using a wave soldering approach wherein a flow of moving molten solder is used to substantially fill a seam in the tube. In a preferred embodiment, a mechanical separation is placed between the tube and the moving molten solder to prevent sealing until a steady state running condition has been achieved. In a second embodiment, the tube is sealed by wrapping a metal foil having a meltable coating about the tube and heating the assembly to melt the coating and effect a seal.

In a third aspect of the present invention, the optical fiber cable is provided with an improved concentricity. The improved concentricity is effected by passing the sealed metal tube through a die for removing any excess material such as solder from about the outer periphery of the tube.

15 Claims, 17 Drawing Figures

U.S. PATENT DOCUMENTS

| | | | |
|---|---|---|---|
| 4,146,302 | 3/1979 | Jachimowicz | 350/96.23 |
| 4,199,224 | 4/1980 | Oestreich | 350/96.23 |
| 4,212,097 | 7/1980 | Portinari et al. | 350/96.23 X |
| 4,239,336 | 12/1980 | Parfree et al. | 350/96.23 X |
| 4,278,835 | 7/1981 | Jackson | 350/96.23 X |
| 4,279,470 | 7/1981 | Portinari et al. | 350/96.23 |
| 4,317,003 | 2/1982 | Gray . | |
| 4,366,770 | 1/1983 | Eckstein et al. | 427/434.7 |
| 4,371,234 | 2/1983 | Parfree et al. | 350/96.23 |
| 4,372,792 | 2/1983 | Dey et al. | 350/96.23 X |
| 4,375,313 | 3/1983 | Anderson et al. | 350/96.23 |
| 4,390,120 | 6/1983 | Broyer | 228/222 |
| 4,460,419 | 7/1984 | Parfree et al. | 350/96.23 |
| 4,573,253 | 3/1986 | Smith et al. | 350/96.23 |
| 4,577,925 | 3/1986 | Winter et al. | 350/96.23 |
| 4,579,420 | 4/1986 | Winter et al. | 350/96.23 |
| 4,594,766 | 6/1986 | Smith, Jr. et al. | 350/96.23 |
| 4,611,748 | 9/1986 | Winter et al. | 350/96.23 |

OTHER PUBLICATIONS

U.S. Ser. No. 618,271, filed Jun. 7, 1984, to Winter et al.

U.S. Ser. No. 646,185, filed Aug. 31, 1984, to Winter et al.

U.S. Ser. No. 780,869, filed Sept. 25, 1985, to Winter et al. (Div. of Ser. No. 497,522).

U.S. Ser. No. 814,445, filed Dec. 3, 1985, to Winter et al. (Div. of Ser. No. 497,546).

Wilkins, "An Electro-Optical Array Support Cable", presented at the Winter Annual Meeting, Nov. 16–20, 1980 of the ASME.

Wilkins et al., "Design and Performance of an Undersea, Single-Fiber, Multi-Repeater, Full Duplex, Electro-Optical Data Link", International Telemetry Conference, San Diego, California, Oct. 13–15, 1981.

Wilkins, "Guidelines to the Design of Optical Cables", presented at the Winter Annual Meeting, Dec. 2–7, 1979 of the ASME.

Wilkins, "Recent Experience with Small, Undersea, Optical Cables", IEEE-EASCON, Oct. 1979, Washington, D.C.

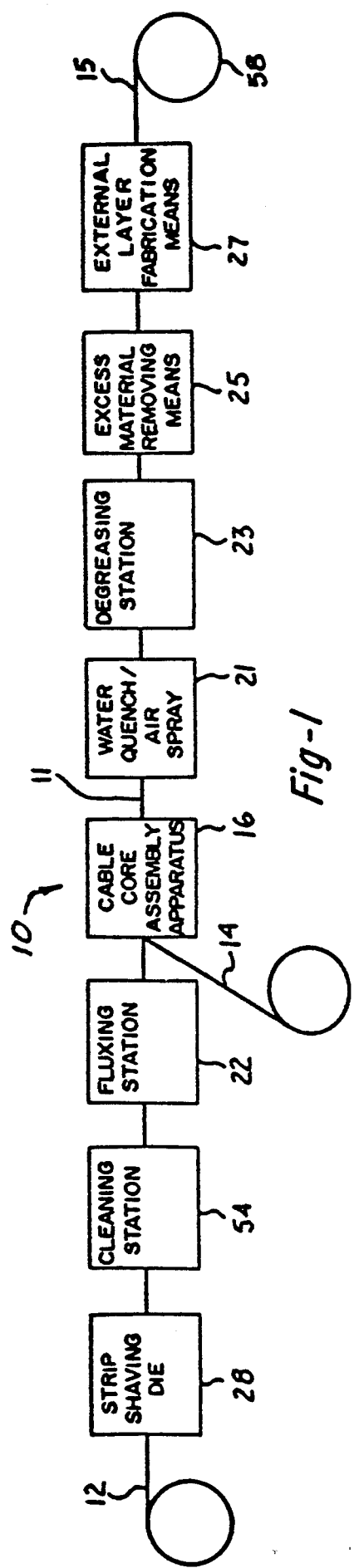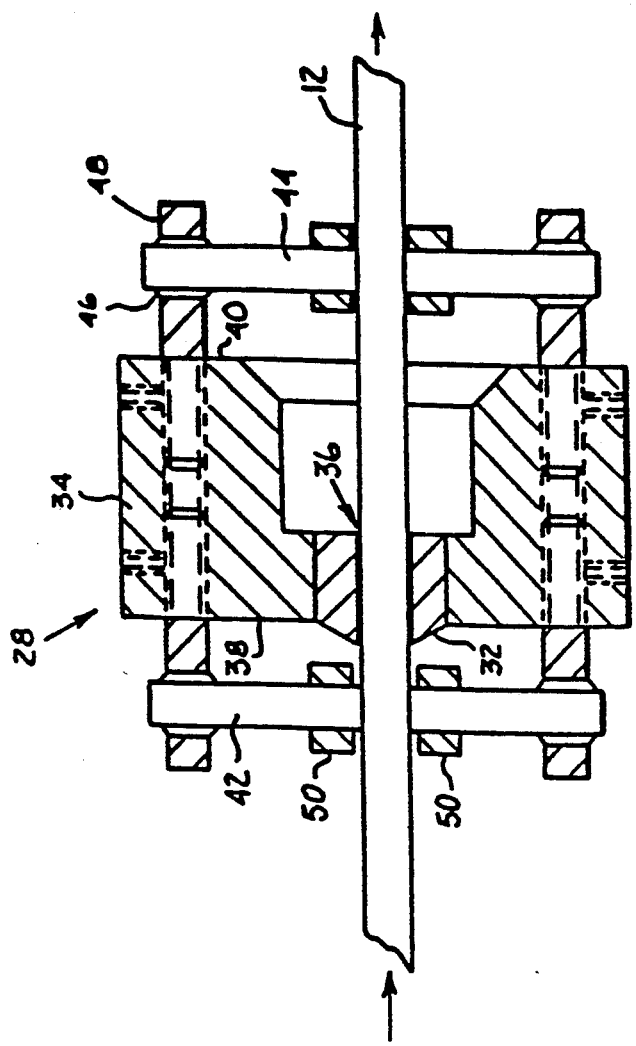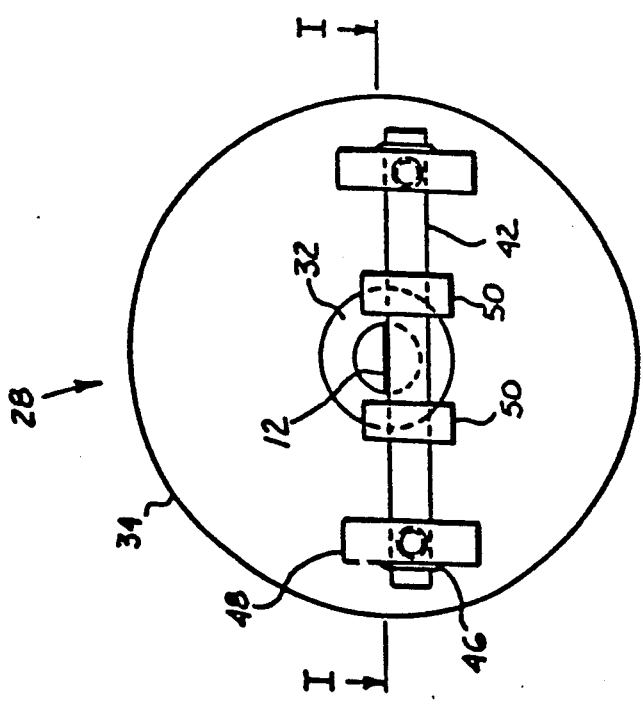

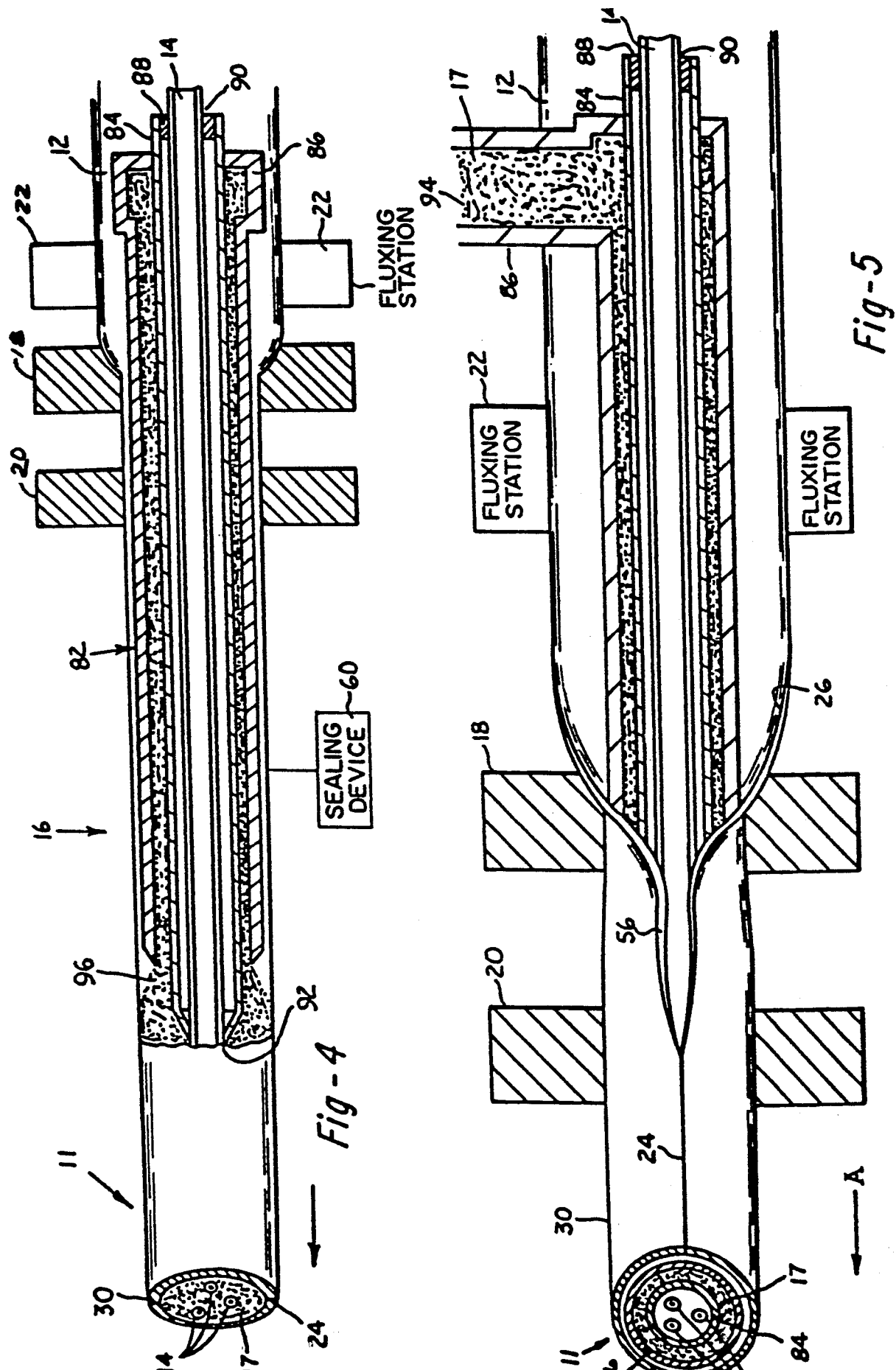

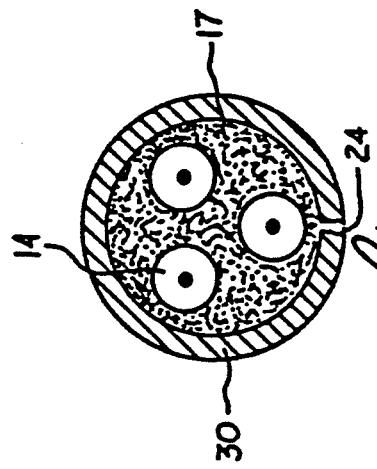
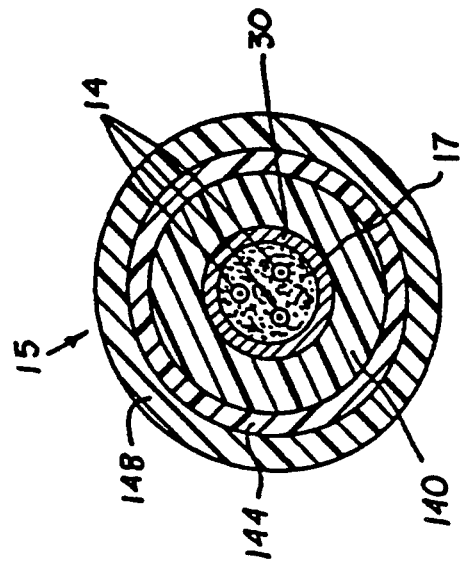
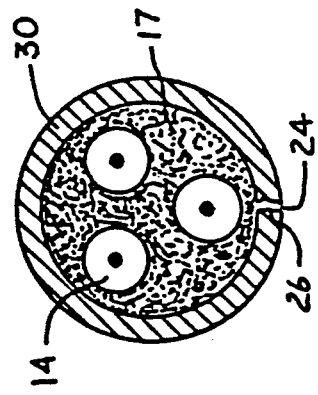
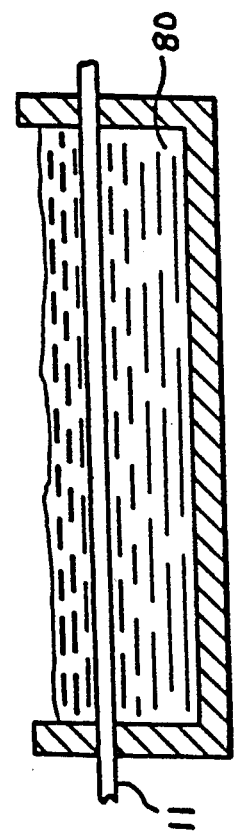

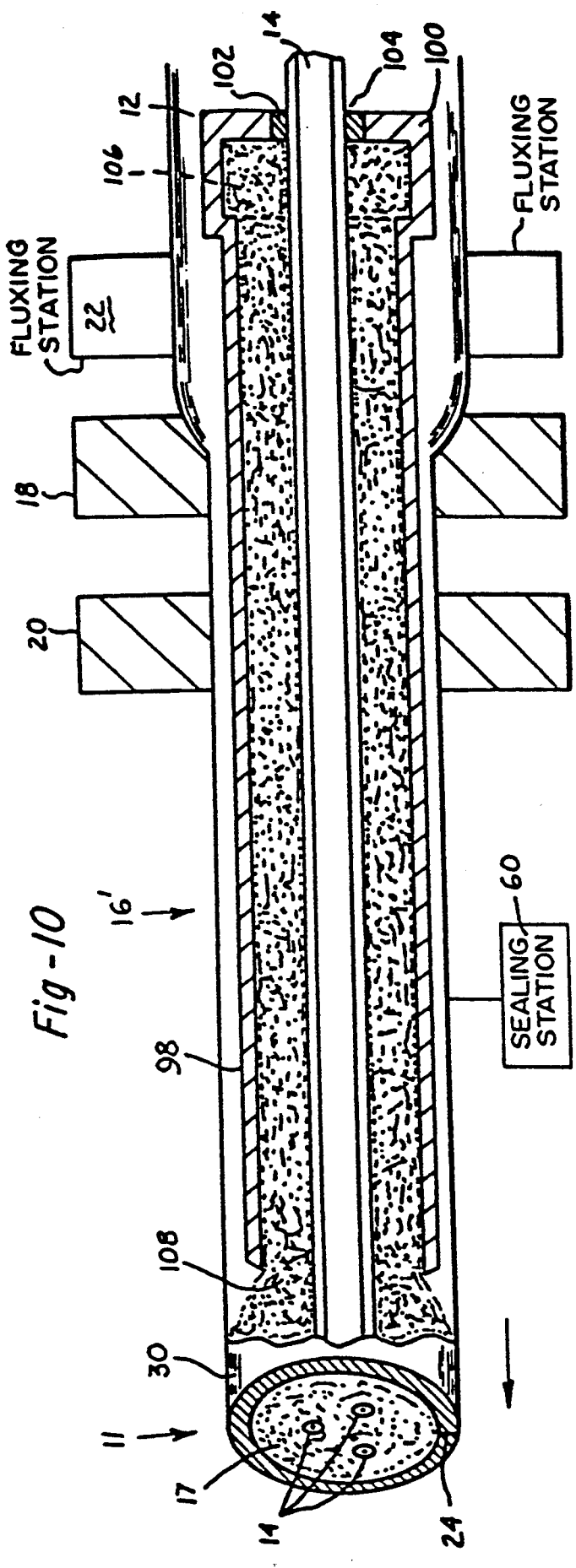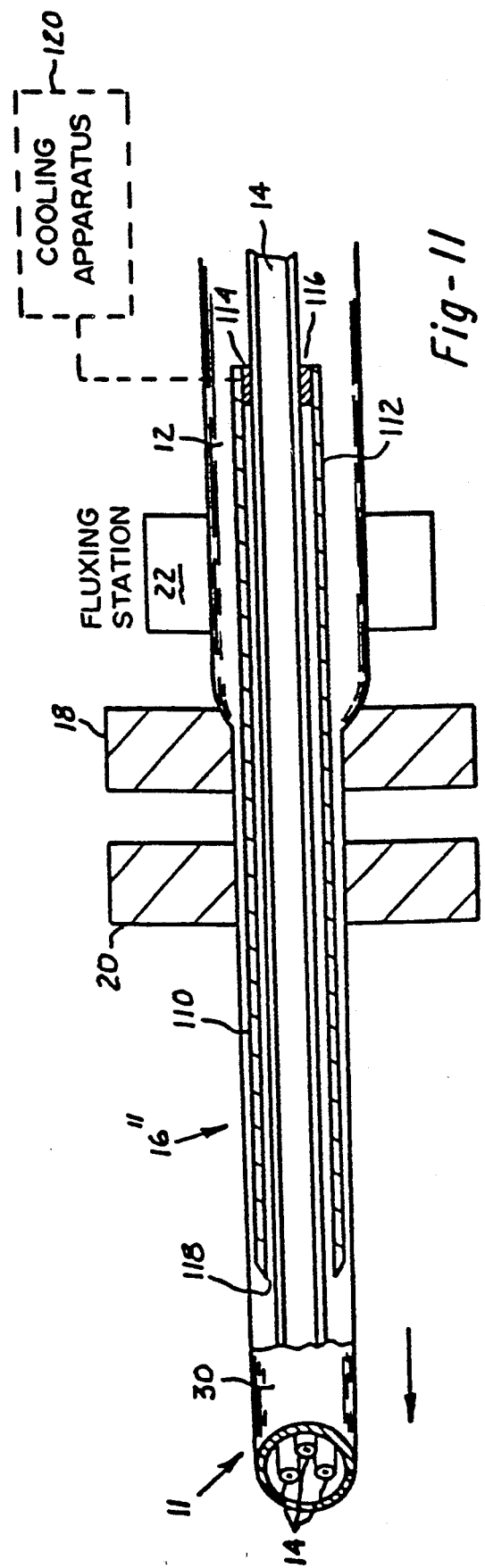

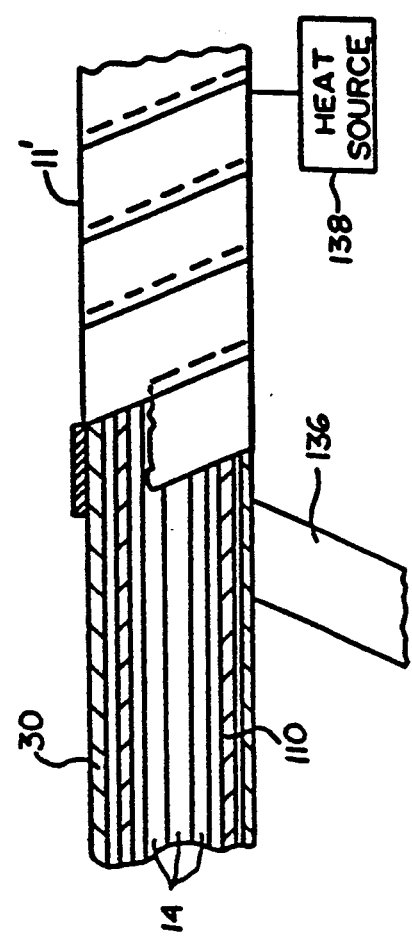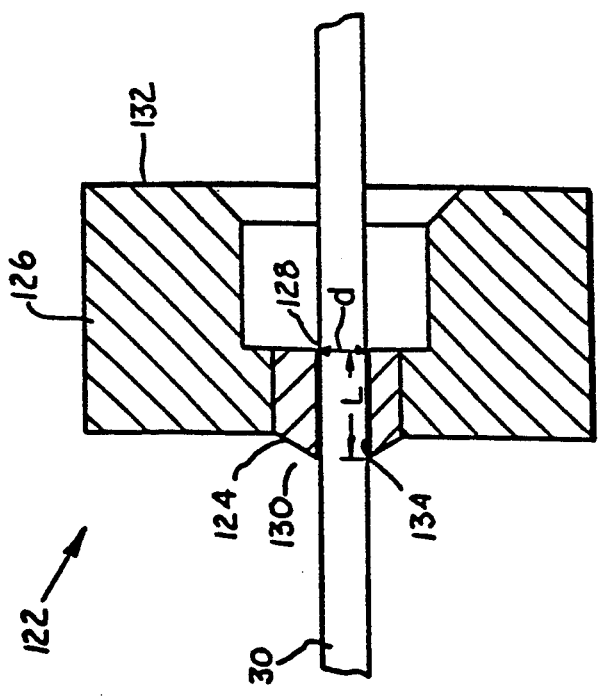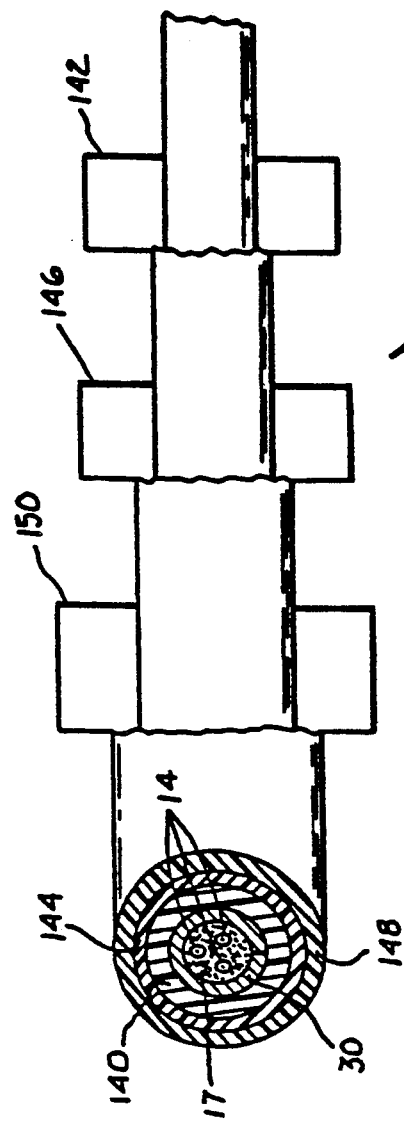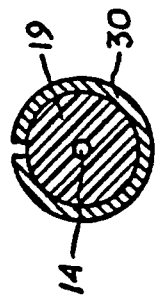

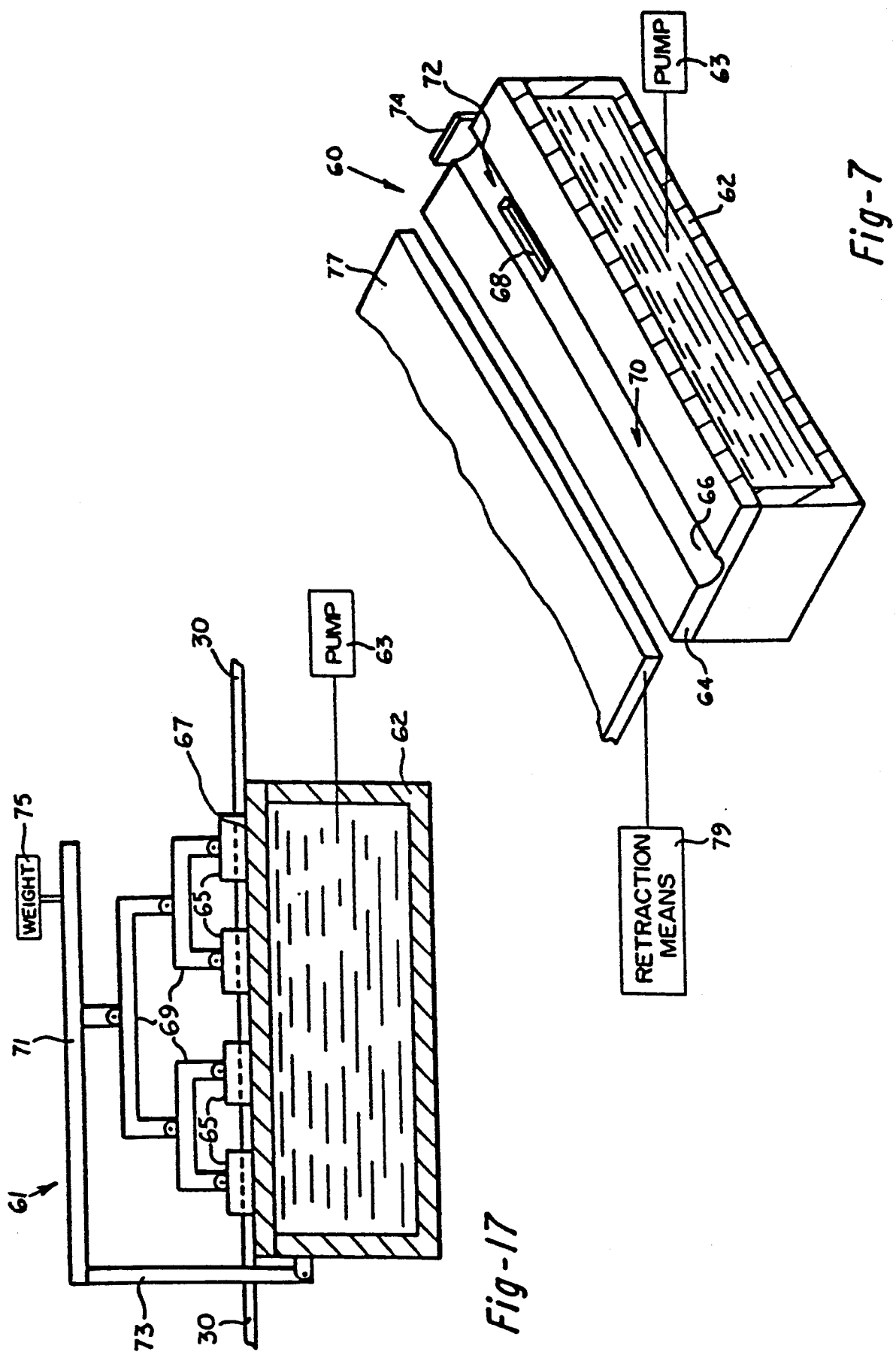

PROCESS AND APPARATUS FOR FABRICATING OPTICAL FIBER CABLES

This application is a continuation of U.S. patent application Ser. No. 497,535, filed May 24, 1983, now U.S. Pat. No. 4,555,054, which is a continuation-in-part of U.S. patent application Ser. No. 413,846, filed Sept. 1, 1982, now U.S. Pat. No. 4,508,423, which is in turn a continuation-in-part of U.S. patent application Ser. No. 324,242, filed Nov. 23, 1981, now abandoned. This application is also related to U.S. patent application Ser. No. 272,154, filed June 10, 1981, now abandoned, for a METHOD AND APPARATUS FOR ASSEMBLING AN OPTICAL FIBER COMMUNICATION CABLE; U.S. patent application Ser. No. 395,443, filed July 6, 1982, now U.S. Pat. No. 4,479,702, for A METHOD AND APPARATUS FOR ASSEMBLING A COMPACT MULTICONDUCTOR OPTICAL FIBER COMMUNICATION CABLE; U.S. patent application Ser. No. 408,087, filed Aug. 13, 1982, now abandoned, for OPTICAL FIBER COMMUNICATION CABLES AND METHOD AND APPARATUS FOR ASSEMBLING SAME; U.S. patent application Ser. No. 430,069, filed Sept. 30, 1982, now U.S. Pat. No. 4,557,559, for a PROCESS FOR DIE FORMING A TUBULAR MEMBER AT A REDUCED DRAWING FORCE; U.S. patent application Ser. No. 461,736, filed Jan. 28, 1983, now abandoned, for A PROCESS AND APPARATUS FOR FABRICATING TUBULAR STRUCTURES; and U.S. patent application Ser. No. 497,639, filed May 24, 1983, now U.S. Pat. No. 4,477,147, for METHOD AND APPARATUS FOR ASSEMBLING AN OPTICAL FIBER COMMUNICATION CABLE.

The invention disclosed herein relates to a method and apparatus for assembling an optical fiber communication cable. The cable produced by the instant invention has utility in underground, undersea, aboveground, and other communication applications.

The advent of optical fibers for use in communication applications has permitted construction of relatively small diameter cables. Generally, optical fiber communication cables are designed to provide all of the required electrical, optical, and physical functions within the smallest possible diameter. Additionally, they should be constructed to have a relatively long uninterrupted length and good flexibility characteristics. Furthermore, in undersea applications, the cables have to be able to withstand the stresses induced by hydrostatic pressure, temperature, and sea action.

Optical fiber communication cable constructions frequently have a metal or metal alloy containment tube in which one or more optical fibers are housed. For some undersea applications, the containment tube also contains an appropriate polyethylene or other long chain plastic gel material for positioning the optical fiber or fibers. While the containment tube acts primarily as a protective environment for the optical fiber or fibers, it may also function as a strength layer and/or an electrical conductor. When used as an electrical conductor, the containment tube could provide power to motors, sensors and other electrical equipment. Typically, the containment tube is surrounded by several layers of appropriate plastic materials such as polyethylene, polyimide, polyamide, plastic filaments such as KEVLAR filaments embedded in an epoxy matrix, or other similar plastics. The surrounding layers may include an outer cover, a strength layer and/or a dielectric layer.

U.S. Pat. Nos. 3,955,878 to Nowak, 4,118,594 to Arnaud, 4,143,942 to Anderson, 4,146,302 to Jachimowicz, 4,199,224 to Oestreich, 4,201,607 to Rautenberg et al., 4,212,097 to Portinari et al., 4,227,770 to Gunn, 4,232,935 to Rohner et al., 4,239,336 to Parfree et al., 4,257,675 to Nakagome et al., 4,275,294 to Davidson, 4,278,835 to Jackson, 4,279,470 to Portinari et al., 4,341,440 to Trezeguet et al. and 4,349,243 to Amano et al., 4,371,234 to Parfree et al., and 4,375,313 to Anderson et al., U.K. Pat. Nos. 1,038,534 to Haywood, 1,172,272 to Kao et al. and 1,479,427 to Dean et al., German Offenlegungsschrifts No. 25-07648 and No. 25-07649, French Pat. No. 2,265,108 and the papers "Guidelines to the Design of Optical Cables" by Wilkins presented at the Winter Annual Meeting, Dec. 2-7, 1979 of the American Society of Mechanical Engineers, "An Electro-Optical Array Support Cable" by Wilkins presented at the Winter Annual Meeting, Nov. 16-20, 1980 of the American Society of Mechanical Engineers, "Recent Experience with Small, Undersea Optical Cables" by Wilkins presented at IEEE-EASCON, Oct. 1979, Washington, D.C., "How Small Can an Electro-Optical Transoceanic Cable Be?" by Wilkins presented at the International Telemetry Society Conference, San Diego, Calif., Oct. 13-15, 1981 and "Design and Performance of an Undersea, Single-Fiber, Multi-Repeater, Full Duplex, Electro-Optical Data Link" by Wilkins et al. presented at the International Telemetry Conference, San Diego, Calif., Oct. 13-15, 1981 illustrate some of the optical fiber cable constructions and fabrication techniques known and used in the prior art.

In one of these prior art fabrication techniques, an optical fiber cable is formed by placing optical fibers within a split aluminum tube. A copper tube which may be welded or soldered is made from copper tape and formed about the aluminum tube so as to provide a hermetic seal. Thereafter, the copper tube may be surrounded by a dielectric layer, a strength member layer, and a sheath. An alternative to this approach surrounds the aluminum tube and optical fibers with a copper tape layer, a dielectric layer, and a sheath. U.S. Pat. No. 4,239,336 to Parfree et al. is illustrative of this type of optical fiber cable.

In a second approach, a metal tube is manufactured such as by extrusion or rolling over a metal strip. The tube is provided with a slit and one or more optical fibers are inserted into the tube through the slit. If desired, a void filling gel may be inserted along with the fiber or fibers. The tube is then squeezed shut and and the slit permanently closed as by welding. The tube is finally surrounded by a dielectric layer, a loadbearing section, and an outer jacket. Illustrative of this approach is "An Electro-Optical Array Support Cable" by Wilkins and U.S. Pat. No. 4,275,294 to Davidson. A similar approach is shown in U.S. Pat. Nos. 4,212,097 and 4,279,470, both to Portinari et al.

Yet another approach known in the art rolls a containment tube from a flat-tape stock of copper material. In this approach, the strip of copper or some other metal or metal alloy passes through a series of roll assemblies. The roll assemblies incrementally close the edges of the strip until a tube is formed. Just before tube closure, the optical fiber or fibers and/or a void filler or pressure buffer layer are inserted into the tube. The tube is then forced shut and permanently welded or soldered. Additional layers consisting of synthetic materials and containing high tensile strength materials may be used to cover the conductor tube. Illustrative of this type of approach are U.S. Pat. Nos. 4,146,302 to Jachimowicz, 4,232,935 to Rohner et al., 4,257,675 to Nakagome et al., 4,275,294 to Davidson, 4,341,440 to Trezeguet et al. and 4,349,243 to Amano et al. A similar approach used to fabricate electrical cables is illustrated by U.S. Pat. No. 3,733,225 to Moody.

The fabrication of optical communication cables by these approaches has been hampered by an inability to get extremely long uninterrupted lengths of assembled cable. Furthermore, the tube has to be threaded with one or more glass conductor rods or fibers whose diameter is approximately ½ mm. Frequently, kinking or breaking of one or more of the fibers occurs during threading, resulting in non-usable cable. In addition, damage to the fibers may occur during the tube sealing operation. If the fiber threading operation is successful, the problem of filling the tube with an appropriate filler while maintaining the fibers in reasonable separation still remains.

Another approach which has been used in lieu of these other approaches is die forming of the containment tube about the optical fiber or fibers. In this approach, a metal or metal alloy strip is passed through one or more forming dies. In one variation, the strip is passed through one or more folding dies. U.S. Pat. No. 4,372,792 to Dey et al. and U.K. Pat. No. 1,583,520 to Chapman illustrate this folding die technique. Another variation is shown by U.S. Pat. No. 4,341,440 to Trezeguet et al. which describes the use of draw plates to form a metal tube about a protective metal casing surrounding one or more optical fibers.

In prior patent applications by the inventors, die forming has been shown to be an excellent technique for fabricating optical fiber containment tubes. However, there does exist a set of problems related to this technique which must be effectively dealt with if an optical fiber cable is to be produced that meets all design criteria. These problems include smooth operation of the forming dies, effective sealing of the containment tube, and the elimination of any excess material about the outer tube periphery which would impair the concentricity of any layer or layers surrounding the tube.

It has been found that the operation of the forming dies can be seriously impacted by metal flakes or particulate formed from shearing burrs along the edges of the metal or metal alloy strip to be formed into the tube. Since the metal or metal alloy strip generally comes from commercial width strip that has been slit and since burr is an inherent part of any slitting operation, it becomes desirable to provide the cable fabrication system with some mechanism for eliminating this strip defect.

As described in parent application Ser. No. 413,846, now U.S. Pat. No. 4,508,423, soldering has been found to be an effective sealing technique. Occasionally, excess solder will flow about and adhere to portions of the tube periphery. This excess solder can, particularly if in the form of lumps of solder, impair the concentricity of any external layer or layers fabricated about the tube. Concentricity is important if the external layer or layers are to exhibit substantially uniform properties about their circumference. Thus, it becomes desirable to provide the cable fabrication system with some mechanism for removing excess solder or other material from the outer tube periphery.

It is, therefore, an object of the present invention to provide a process and apparatus for more efficiently assembling an optical fiber cable.

It is a further object of the present invention to provide a process and apparatus as above having improved operation of the dies for forming the cable core.

It is a further object of the present invention to provide a process and apparatus as above having an improved technique for sealing the cable core.

It is a further object of the present invention to provide a process and apparatus as above for producing a cable having improved concentricity.

These and other objects will become more apparent from the following description and drawings.

In accordance with the instant invention, there is provided an improved method and apparatus for assembling an optical fiber communication cable. The method of assembly according to the instant invention comprises forming a containment tube from a metal or metal alloy strip, sealing the containment tube, and releasing into the sealed containment tube one or more optical fibers. By releasing the optical fiber into the containment tube after the sealing operation has been completed, the likelihood of damaging the fiber or fibers is minimized.

More particularly, the cable fabricating technique utilizes at least one forming die to form a metal or metal alloy strip into a containment tube. In a preferred embodiment, the containment tube is formed in a two-step operation using two forming dies. Prior to entering the forming die or dies, the strip is preferably passed through a shaving die. The shaving die removes any shearing burrs from the strip edges and any excess strip width. If the width of the strip is too large, buckling of the tube could occur during tube formation. As previously discussed, removal of the shearing burrs helps promote smooth die operation.

In a preferred embodiment, the shaving die comprises a carbide insert mounted in a suitable holder. The carbide insert has an internal bore that is shaped so that only strip material whose width and corners are within very narrow tolerance ranges will pass. In using this shaving die, it is desirable to have the strip pass through the approximate center of the die.

To insure that the strip passes through the shaving die in proper alignment, the shaving die is provided with means for controlling the orientation of the strip. Preferably, the orientation control means comprises guide rollers adjacent the entry and exit faces of the shaving die and strip edge guides. In the preferred embodiment, the guide rollers are arranged to pass the strip through the approximate center of the die. If desired, the guide rollers may be arranged to pass the strip through the die offcenter so that the strip may be shaped to have a desired cross section, such as a trapezoidal cross section.

After the strip has been die formed into the containment tube, it is passed to a station for soldering the tube seam. In a preferred embodiment, the seam is sealed using a meniscus or wave soldering approach This type of approach is preferred because it permits the containment tube to be maintained substantially straight and under tension during the sealing process. In addition, the amount of solder that can flow about and adhere to portions of the outer tube periphery other than the seam area is minimized.

In a preferred arrangement, the soldering station comprises a plate having a groove through which the tube passes preferably with the seam facing downwardly. The groove is divided into a preheat zone and a flow zone. The flow zone comprises a slot in the bottom of the groove through which molten solder flows and comes into contact with the tube seam. The molten solder is pumped up to the slot and is under a very slight pressure. The motion of the tube and the molten solder under pressure causes the solder to capillary up into and fill the tube seam.

In using this meniscus-type soldering approach, it has been discovered that it is desirable to delay the start of the soldering operation until the metal strip feed into the forming die or dies and the optical fiber feed and filler material feed, if any, into the forming tube reach a desired steady state condition. To prevent soldering of the tube during this start-up, a mechanical separation such as a Fiberfax shim is placed between the tube and the solder flow slot. After the desired steady state condition has been reached, the mechanical separation is removed and soldering is begun.

In lieu of meniscus soldering, the tube seam may be sealed using either a dip soldering or rod feed soldering technique. In dip soldering, the tube containing the optical fiber or fibers is drawn through a pool of molten solder. In rod feed type soldering, the tube is preheated and a rod of appropriate soldering material is rubbed against the tube seam. The tube may be preheated using any suitable heating technique.

During the tube forming and the seam sealing operations, one or more optical fibers and/or a filler material are preferably housed within a protective sheath located internally of the tube. The protective sheath substantially prevents the transmission of heat from the sealing operation to the fiber or fibers and any filler material, prevents any filler material from adversely affecting the seam sealing operation, and in general, protects the optical fiber or fibers. After the sealing of the seam has been completed, the fiber or fibers and/or the filler material are released into the containment tube. In a first embodiment, the optical fiber or fibers are released into the containment tube downstream of the location where the filler material is released into the sealed containment tube. In a second embodiment, the optical fiber or fibers are released into the sealed containment tube substantially simultaneously with the filler material. In a third embodiment, the optical fiber or fibers are released into the sealed containment tube without any filler material.

In a first embodiment, the protective sheath comprises concentric chambers or passageways for inserting both a filler material and one or more optical fibers into the sealed containment tube. Preferably, one of the concentric chambers or passageways extends into the containment tube farther than the other. In a preferred embodiment, the protective sheath inserts the fiber or fibers into the containment tube downstream of the location where the filler material is injected into the sealed containment tube. In a second embodiment, the protective sheath comprises a single passageway or chamber for substantially simultaneously inserting into the containment tube the filler material and the fiber or fibers. In a third embodiment, the protective sheath comprises a single passageway or chamber for inserting one or more optical fibers into the sealed containment tube without any filler material.

To substantially prevent the transmission of heat from the seam sealing operation to the fiber or fibers and/or the filler material, the protective sheath is preferably formed from a material having a relatively low thermal conductivity. It is also desirable that the protective sheath be formed from a material that will not be bonded to the containment tube by the seam sealing means and that can withstand the temperatures associated with the seam sealing operation. Suitable materials for forming the protective sheath include high stainless steels, refractory alloys, ceramics and insulating materials. Alternatively, the protective sheath may be formed from suitable composite materials. The composite may comprise an outer material having a low thermal conductivity and an inner material having a higher thermal conductivity.

If desired, the protective sheath may be joined to an external cooling system for withdrawing heat within the protective sheath.

After the tube seam has been soldered, the tube may be passed through a die arrangement for removing excess solder from about the tube periphery. This die preferably comprises a shaving die having a bore with a diameter such that excess material, e.g. solder, about the outer periphery of the tube is removed without reducing the hermeticity and the strength of the sealed tube. This die helps provide the outer tube surface with an improved concentricity. As previously discussed, this improved concentricity is needed so that more uniform and concentric external layers can be fabricated about the containment tube.

In yet another embodiment of the instant invention, the containment tube is hermetically sealed using solder coated copper foil in lieu of seam soldering. In this approach, the solder coated copper foil is helically wrapped about the containment tube and heated to braze the assembly. As well as solder coated copper foil, tin coated copper foil could be used to seal the containment tube.

The copper foil used in this sealing technique may be made by metal rolling processes or by electrodeposition processes. It may be coated with solder or tin using either a hot dipping procedure or an electrodeposition procedure. The coating can be applied to one or more surfaces of the copper foil.

The solder or tin coated copper foil may be heated using an induction coil, a radiant heater, a furnace, or any other suitable rapid heating device. In a preferred embodiment, an induction coil operating at a relatively high frequency is used. By using a relatively high frequency, the heat can be concentrated at the outer tube surface and the risk of damaging the fiber or fibers within the tube is minimized.

After the containment tube has been sealed, it may be surrounded by one or more external layers. The external layers may comprise a dielectric layer, a loadbearing layer, and/or an outer covering. Preferably, these external layers are fabricated from suitable plastic materials.

The cables produced in accordance with the method and apparatus of the instant invention are characterized by a relatively small diameter and good flexibility characteristics. They should be capable of resisting the sea action, the pressures and the temperatures associated with undersea applications. In addition, the cables are capable of being level wound on a storage reel, of being stored on a reel with a minimum total volume and of having relatively long uninterrupted lengths.

The cables produced by the instant invention may be used in undersea, underground and above-ground environments. If desired, the containment tube may be used as an electrical conductor for transmitting power. Alternatively, the containment tube may be used solely as a strength and protection member.

Embodiments of the method and apparatus for assembling the optical fiber communication cable and the cable produced by the instant invention are shown in the drawings wherein like numerals depict like parts.

FIG. 1 is a block diagram of an apparatus for assembling an optical fiber communication cable.

FIG. 2 is a front view of a die for shaving metal strip.

FIG. 3 is a cross-sectional view of the shaving die taken along lines I—I in FIG. 2.

FIG. 4 is a schematic representation in partial cross section of a first embodiment of an apparatus for assembling a communication cable core.

FIG. 5 is a schematic representation in partial cross section of a bottom view of a portion of the apparatus of FIG. 4.

FIG. 6 is a cross-sectional view of a cable core assembled by the apparatus of FIG. 4.

FIG. 7 is a schematic view in partial cross section of a meniscus soldering device used in the apparatus of FIG. 4.

FIG. 8 is a schematic view in partial cross section of an alternative seam soldering apparatus.

FIG. 9 is a schematic view in partial cross section of yet another seam soldering apparatus.

FIG. 10 is a schematic representation in partial cross section of a side view of a second embodiment of an apparatus used to assemble an optical fiber communication cable core.

FIG. 11 is a schematic representation in partial cross section of yet another embodiment of an apparatus for assembling an optical fiber communication cable core.

FIG. 12 is a schematic representation in partial cross section of a shaving die for removing excess material and/or solder from a cable core assembly.

FIG. 13 is a schematic view in partial cross section of an alternative approach to sealing the core assembly using solder-coated copper foil.

FIG. 14 is a schematic representation in partial cross section of an apparatus used to fabricate the external layers of an optical fiber communication cable.

FIG. 15 is a schematic representation in cross section of an optical fiber communication cable produced in accordance with the instant invention.

FIG. 16 is an embodiment of a cable core which can be fabricated using the apparatus of FIG. 11.

FIG. 17 is a side view in partial cross section of the soldering device of FIG. 7.

In accordance with this invention, a process and apparatus for assembling an optical fiber communication cable are provided. The process described herein makes use of a die forming technique to form a cable core having a metal or metal alloy containment tube with a relatively small diameter and a relatively long uninterrupted length. The cable produced by the instant process and apparatus should satisfy all electrical, physical, and operational constraints for underground, undersea, above-ground and other uses.

Furthermore, the instant process and apparatus permit production of a relatively small diameter cable having a core that exhibits excellent strength and flexibility characteristics. The cable produced by the instant process and apparatus may have a diameter substantially about one-quarter that of a conventional cable and a transportation volume substantially about one-tenth that of a conventional cable.

The process of assembling the optical fiber communication cable of the instant invention is relatively inexpensive and simple to perform. The instant process readily solves the problem of forming, filling, and sealing a containment tube with negligible risk to the optical fiber or fibers to be inserted into the tube. It also produces a containment tube that is substantially free of internal and external rough spots, both substantially circular and concentric, substantially clean on both the internal and external surfaces before, during, and after tube fabrication, and capable of being used as an electrical conductor.

Referring now to the figures, an apparatus 10 for assembling an optical fiber communication cable 15 is illustrated. The cable 15 has a cable core 11 comprising a containment tube 30 in which one or more optical fibers 14 are housed. The containment tube 30 is preferably formed from a metal or metal alloy strip 12. The apparatus 16 for assembling the cable core preferably comprises means for forming a tube, means for sealing the tube and means for inserting at least one optical fiber and a filler material, if needed, into the sealed tube. In a preferred embodiment, the tube forming means comprises means for drawing the strip 12 through a first die 18 where it is formed into an open tube section 56 and then through a second die 20 wherein the open tube section is formed into a substantially closed tube 30.

The strip 12 may be a single length of material or may be a plurality of lengths joined together. If the strip 12 comprises a plurality of joined lengths, the lengths may be joined in any suitable manner. For example, conventional joining techniques such as brazing, soldering, welding and diffusion bonding may be used to bond the strips together.

Strip 12 may be formed from any metal or metal alloy that exhibits a desired set of properties. The desired properties would depend upon the ultimate use of the formed tube. In fabricating containment tubes for communication cables, properties such as strength, formability and electrical conductivity are important. The strip 12 should have sufficient hardnesss to enable it to be formed into a tube by being drawn through one or more forming dies. Accordingly, the starting strip 12 should be work hardened to a hardness of at least about ¼ hard and preferably at least about full hard.

It has been found to be quite advantageous to form the tube 30 from a strip 12 having a transverse cross-sectional area which exceeds the desired transverse tube cross-sectional area by about 5% to about 20%, preferably by about 8% to about 17% and most preferably by about 10% to about 15%. Inherently with the tube forming technique used herein, the extra volume of metal provided by the excess cross-sectional area or strip width shows up essentially as longitudinal extension of the resulting tube 30, It has been found that using the tube forming technique described herein, there is no significant change in wall thickness. The wall thickness of the tube 30 is substantially the same as the thickness of the strip 12. The tube-forming techniques described herein are, therefore, similar in some respects to "tube sinking". The total length of tube 30 produced by the tube-forming technique will be greater than the total length of the strip 12 due to the aforenoted longitudinal extension of the tube 30. The amount of the tube extension corresponds substantially to the aforenoted percentage differentials in strip cross-sectional area versus tube cross-sectional area.

The extra volume of metal also inherently assists in the formation of a tube having a relatively tight seam 24 without a notch or well at the outer periphery of the seam. Further, the edges 26 of the metal tube 30 are inherently deformed by the tube-forming techniques described above to provide substantially non-linear and intermeshing edges 26. This results in an increased surface area of the edges 26 to which a sealing material can adhere as compared to the original strip 12 edges thereby improving the resultant strength of the seal. As a result, the cable core 11 of the instant invention has better hermeticity than prior cable core assemblies.

The deformed intermeshing edges 26 are the inherent result of the tube-forming techniques used herein and do not correspond to the shape of the original strip edges. The deformed edges 26 result from the drawing or sinking of the tube by the process of this invention.

In contrast, a tube formed by folding even with the use of a die forming technique would not have such deformed edges since in a folding operation the starting strip would not include the excess material which the process of this invention converts into longitudinal extension by drawing or sinking. A deficiency of the folding technique is that a well or depression occurs at the outer surface along the seam. In accordance with this invention, the presence of excess material from the metal strip causes the outer surface to form against the die so as to eliminate such a well or depression along the seam. This is highly significant since it reduces the amount of solder or brazing material which would be required to provide a circular outer periphery to the resultant tube 30.

In performing a tube forming operation that uses one or more dies, it is important for smooth operation of the die to use a metal strip 12 which has extremely close tolerance in width and is substantially free of any shearing burrs along its edges. This can be a problem where the strip 12 has come from commercial strip that has been slit to the desired strip width. The two criteria, slit width and burr, are extremely difficult to achieve in normal production. Standard tolerances on slit strip are usually ±0.005 at best and burr is an inherent part of most slitting operations.

Referring now to FIGS. 1-3, prior to being drawn through the initial forming die, the strip 12 is drawn through a shaving die 28. The shaving die 28 preferably comprises a carbide insert 32 mounted in a holder 34. The insert 32 may be mounted in the holder 34 in any suitable manner known in the art. The insert 32 has a bore 36 which is shaped to shave anything outside a desired dimension. Therefore, only strip whose width and edges are within very narrow ranges of tolerance will pass. Shaving die 28 shaves the strip edges to remove any excess width and any shearing burrs. Preferably, the insert 32 has a circular bore. While the insert 32 has been mentioned as being a carbide insert, it may be formed from any suitable material.

It has been found that it is desirable to have the strip 12 pass through the approximate center of the insert bore 36. To do this, strip orientation and strip edge guide means are provided adjacent the entry and exit faces 38 and 40, respectively, of the shaving die 28. The strip orientation means preferably comprises rotatable shafts or rollers 42 and 44 adjacent the entry and exit faces 38 and 40, respectively. The rotatable shafts 42 and 44 are aligned so the strip 12 preferably passes through the approximate center of the insert bore 36.

The shafts 42 and 44 may be mounted to the holder 34 in any suitable manner. For example, the shafts 42 and 44 may be mounted in bearings 46 which are mounted to the holder by arms 48.

The strip edge guides preferably comprise shaft collars 50 mounted on shafts 42 and 44. The collars 50 may be mounted on the shafts in any suitable manner known in the art. The collars 50 should be aligned to pass the strip 12 laterally through the approximate center of the insert bore 36.

In some circumstances, it is desirable to shape the cross section of the strip 12 to later reduce the drawing forces exerted on the strip 12 by the tube forming dies 18 and 20. It has been found that the desired reduction in drawing force can be achieved if the strip 12 is provided with a trapezoidal cross section. By arranging shafts 42 and 44 so they are offset with respect to the center of the bore 36, it is possible to provide the strip 12 with a substantially trapezoidal cross section at the same time that the shearing burrs and excess width are being removed.

It has been discovered that shaving of the strip can be accomplished very efficiently if the insert has a leading edge having an angle of about 20° to about 30°, preferably about 25° with respect to the direction of strip movement. Additionally, the insert should have as small a clearance angle as possible, preferably no larger than about 3°.

After having any excess width and any shearing burrs removed, the strip 12 may be passed through a cleaning station 54 to remove any contaminants or loose particles on the strip. The type of cleaning system used will depend upon the metal or metal alloy forming the strip and the nature of the contaminants to be removed. Any suitable conventional cleaning system known in the art may be utilized.

After being cleaned, the strip 12 is preferably passed through a fluxing station 22. The fluxing station may comprise any conventional means known in the art for applying any conventional flux to the strip edges. Since fluxing the strip edges is not absolutely necessary to form the containment tube 30, fluxing station 22 may be omitted if desired.

The strip 12 is then fed into the core assembly apparatus 16. Referring now to FIGS. 4 and 5 where a first embodiment of the core assembly apparatus 16 is illustrated, the strip 12 is formed into a containment tube 30 preferably in the following manner. The strip 12 is drawn through a first die 18 in which it is formed into an open tube section 56 having major and minor diameters. The minor diameter should be less than the desired diameter for tube 30. Die 18 preferably comprises a die having a substantially circular bore with a relief notch not shown. While tube section 56 has been described as being an open tube section, it may also be described as being a substantially closed tube section.

Thereafter, open tube section 56 is drawn through a second die 20. In the die 20, the legs of the open tube section 56 are brought together until the edges 26 are brought into edge-to-edge confrontation. It is believed that this two-die technique and the excess volume of metal in the strip cause residual compressive forces to be created that hold the edges 26 forming the seam 24 in close proximity. In addition, as previously discussed, the excess material is redistributed and the edges 26 take on a substantially non-linear, intermeshihg configuration. The substantially non-linear edges 26 provide an increased surface area to which a sealing material can adhere. As a result, tube 30 can be provided with a relatively high degree of hermeticity. In practice, the edges 26 become quite jagged. The die 20 preferably comprises a bending-expansion die.

Strip 12 may be drawn through the dies 18 and 20 by any suitable means known in the art for applying a forward tensile force to the strip 12. Strip 12 is connected to a take-up reel 58 by any suitable means not shown known in the art. If needed, a cable puller not shown such as a caterpuller winch may be used to assist in drawing the strip through the core assembly apparatus 16.

The manner in which the dies 18 and 20 form the strip 12 into a containment tube 30 is more fully described in co-pending U.S. patent application Ser. No. 461,736 to Winter et al., filed Jan. 28, 1983, now abandoned, which is hereby incorporated by reference. In lieu of the above-described two-die tube forming technique, the containment tube 30 may be formed by a one-die technique such as that described in parent application Ser. No. 413,846, now U.S. Pat. No. 4,508,423 or by the two-die technique described in U.S. patent application Ser. No. 408,087 to Winter et al., filed Aug. 13, 1982, now abandoned which is also hereby incorporated by reference.

After the containment tube 30 has been formed, it is passed to a station 60 for closing the seam 24. While sealing station 60 may comprise any conventional sealing apparatus for soldering, welding, brazing or applying any other suitable sealing technique, it preferably comprises a meniscus or wave soldering apparatus.

Referring now to FIGS. 7 and 17, the meniscus soldering apparatus preferably comprises a sump or bath 62 of solder covered by a plate 64. In a preferred embodiment, the plate 64 is provided with a groove 66 through which the containment tube 30 passes preferably with the seam 24 facing downward. Groove 66 is shaped to correspond to the cross-sectional shape of the tube 30 and has dimension substantially equal to the outer dimension of the tube 30.

The soldering apparatus preferably has a preheat zone 70 in which the metal tube 30 is heated and a flow zone 72 in which soldering occurs. The tube 30 is heated in the zone 70 by the heat of the molten solder in the sump 62. Sump 62 may be provided with any suitable means not shown known in the art such as heating coils for keeping the solder in a molten condition.

The flow zone 72 is defined by a slot 68 in the plate 64. Slot 68 acts as a soldering head. Slot 68 is preferably located in a bottom portion of the groove 66. By locating the slot there, groove 66 will function as an alignment device for insuring that tube seam 24 passes over the slot. Slot 68 should have a width substantially equal to the seam to be soldered so that solder will not flow about the outer tube periphery and a length substantially smaller than the length of the preheat zone.

In using this apparatus, pressure is applied to the molten solder in the sump 62 by an impeller such as pump 63. The pressure creates a head in the molten solder and causes waves of solder to rise in the sump 62. When a sufficient head has been created, the solder will flow through the slot 68. The movement of the tube 30 over the slot 68, surface tension and the pressure drive the solder into the seam interface formed by the edges 26. The solder capillaries up into and substantially fills the seam 24.

The pressure applied to the solder to drive it through the slot 68 should be very slight. If the pressure is too great, an air space which permits solder to flow about the tube periphery can be created. In an extreme condition, the pressure could force the tube 30 out of the groove 66. If desired, a cover 61 may be placed over the tube 30 in the groove 66. The cover 61 insures that the tube is kept in the groove and that solder does not flow out side portions of the groove and/or flow into the preheat zone 70. In a preferred embodiment, the cover 61 comprises a series of plates 65 hinged in any suitable manner to arms 69 which are in turn connected in any suitable manner to a hold-down bar 71. The hold-down bar 71 preferably has a weight 75 mounted to it to apply a pressure to the plates 65. Each plate 65 may have a groove 67 which corresponds to the outer shape of the tube 30. The plates 65 are individually hinged so that a substantially uniform pressure may be applied to the tube 30 and the tube 30 may be kept in the groove even if there is a discontinuity on or a bend in the tube 30. The hold-down bar 71 may be mounted to sump 62 in any convenient fashion such as by support 73.

Sealing the seam 24 in this fashion provides several benefits. First, since the tube 30 and the seam 24 pass directly over the slot 68 and the solder is under a very slight pressure, the likelihood of excess solder flowing about the tube periphery is minimized. Second, the containment tube 30 may be kept substantially straight and under tension during the sealing operation. Third, the capillary action of the solder causes improved sealing of the tube seam.

Any suitable solder including silver solders, high-temperature solders and low-temperature solders such as lead-tin solder, lead-antimony solder and tin-antimony solder may be used.

During start-up of the cable assembly apparatus, it has been found to be desirable not to begin sealing the seam 24 until a steady state operating condition has been reached. Where the core assembly does not include a filler material, the steady state operating condition may be defined as the equilibrium state where tube formation and fiber insertion are being performed at a desired running speed and a desired soldering temperature has been reached. Where the core assembly also includes a filler material, the steady state operating condition may be defined as above with the additional requirement that sealing be delayed until it is clear that the filler material is being inserted into the forming tube. By waiting until a steady state condition has been reached to begin sealing, the time delays and hazards associated with start-up and the acceleration to running speed can be avoided. To prevent sealing, a mechanical separation such as plate 77 may be placed between the tube 30 and the slot 68. After the steady state operating condition with a desired running speed has been reached, the plate 77 may be removed and the sealing operation begun. Any suitable retraction means 79 such as a rack and pinion arrangement, piston and cylinder, or a solenoid arrangement may be used to move plate 77 in and out of position. When slot 68 is covered by the plate 77, tube 30 should pass over the plate 77. By waiting until the desired running speed has been reached to start the sealing operation, any risk of damaging the optical fiber or fibers 14 as a result of too slow a running speed is substantially eliminated. In one embodiment, plate 77 may comprise a Fiberfax shim.

After passing over slot 68, containment tube 30 preferably passes over a wiping device 74 for removing any excess solder. Wiping device 74 may comprise a spring wipe or any other suitable wiping mechanism.

In lieu of the meniscus soldering approach, a rod soldering or hot dipping approach may be used to seal the seam 24. In the rod soldering approach, the containment tube 30 is heated after it is formed. The tube 30 may be heated by any conventional heating device 76 such as a furnace, an induction coil or a radiant heater. Preferably, the heating device used rapidly heats the tube 30. After the tube 30 has been heated, a rod 78 formed from a suitable solder is placed in contact with the seam 24. The solder is permitted to melt and flow into the seam to seal the tube.

In the hot dipping approach, the containment tube 30 is drawn through a pool 80 of molten metal. The tube 30 may be drawn through the pool 80 in any suitable manner. The motion of the tube 30 through the molten metal pool 80 will cause the molten metal to flow into the seam 24 and seal it. In a preferred embodiment, the molten metal comprises lead-tin solder or pure tin. Any suitable conventional heating device not shown known in the art may be used to keep the metal in a molten state. In using this approach, it is important to avoid immersion of the tube 30 in the molten metal for long periods of time. If tube 30 remains in the heated molten metal for too long a period of time, there is a risk of damaging the optical fiber or fibers 14 within the tube 30. While this technique will efficiently seal the seam 24, it also causes substantially the entire outer tube periphery to become coated with metal.

Referring now to FIGS. 4 and 5, during the tube forming and sealing operations, one or more optical fibers 14 and, if needed, a suitable filler material 17 are preferably located within a protective sheath or capillary means 82. The tube forming operation preferably takes place about the protective sheath 82. In some circumstances, the protective sheath 82 may function as a mandrel.

The primary function of the protective sheath 82 is to prevent the sealing operation from damaging the fiber or fibers 14 and any filler material 17 and to prevent the filler material 17 from seeping into the seam 24 and adversely affecting the sealing operation. After the solder has solidified and the containment tube 30 has been sealed, the fiber or fibers 14 and any filler material 17 are inserted into the tube. As used herein, the term inserted means released from the protective sheath and deposited into the sealed tube. In a preferred embodiment of the instant invention, the filler material 17 is inserted into the tube 30 just upstream of the insertion of the optical fiber 14 into the tube.

In a first embodiment, the protective sheath 82 comprises a first chamber or passageway 84 through which the optical fiber or fibers 14 pass and a concentric second chamber or passageway 86 for inserting the filler material 17. Passageway 84 has a pressure seal 88 with an inlet opening 90 at a first end. The optical fiber or fibers 14 enter the passageway 84 through the opening 90. At the opposite end of passageway 84 is an outlet opening 92. Passageway 84 and outlet 92 guide the optical fiber or fibers 14 and deposit or release the fiber or fibers 14 into the containment tube 30 preferably after the solder has solidified and the tube has been sealed. One advantage to releasing the fiber or fibers 14 into the tube 30 after the sealing operation has been completed is that the risk of the sealing operation damaging the fiber or fibers is minimized. In a preferred method of assembling this type of optical fiber communication cable, the fiber or fibers 14 are inserted into the tube 30 downstream of the location where the filler material 17 has been injected or inserted into the tube 30.

The passageway 86 for inserting filler material 17 into the tube 30 preferably concentrically surrounds the passageway 84. The filler material 17 enters the passageway 86 through an inlet opening 94, preferably while under pressure. The passageway 86 has an outlet opening or exit nozzle 96 through which the filler material 17 flows into the tube 30. Passageway 86 extends a distance sufficient to insure that the filler material 17 does not flow into the tube until after the solder has solidified. By waiting until after the solder has solidified and the tube 30 has been sealed to inject the filler material 17 into the tube 30, any risk of the filler material 17 adversely affecting the sealing operation or vice-versa is minimized and an improved seal may be effected. If the filler material 17 were inserted before the sealing operation had been completed or before solder solidification, the filler material 17 could flow into the seam 24 and adversely affect the sealing operation by preventing the solder from capillarying up into the seam interface.

The filler material 17 is preferably introduced into the passageway 86 under pressure so that as the filler material 17 flows into the tube 30, it substantially fills the tube and substantially surrounds the optical fiber or fibers 14. Filler material 17 helps position the fiber or fibers 14 within the tube 30. Any suitable mechanism not shown can be used to supply the filler material 17 under pressure to passageway 86. The filler material 17 is in part caused to flow through outlet opening 96 by the motion of tube 30. The movement of tube 30 in the direction of arrow A is believed to create a suction force on the filler material 17. This suction force helps draw the filler material 17 through the opening 96 and into the tube 30.

Although the filler material 17 may be introduced into the passageway 86 in substantially any form and at substantially any desired temperature, it has been found to be desirable to insert the filler material 17 into the passageway 86 in a heated condition. This heated condition improves the flowability of the filler material 17 by making the filler material more fluid. As a result of this improved flowability, it is believed that the filler material can be drawn out of the outlet 96 and into the tube 30 at a lower suction force than would ordinarily be required. Any suitable conventional heating device not shown may be used to heat the filler material 17 either before or after it enters the passageway 86.

In a preferred embodiment of the protective sheath 82, passageways 84 and 86 are not coextensive. Preferably, the outlets 92 and 96 are arranged so that the filler material 17 enters the tube 30 upstream of the location where the release of the optical fiber or fibers 14 into the tube takes place.

While any suitable technique may be used to insert the fiber or fibers 14 into the tube, it is preferred that the fiber or fibers 14 be inserted without the application of any significant tension. By doing this, it is possible to place each fiber 14 into static compression during the core assembly. A preferred fiber insertion technique is more fully described in allowed co-pending application Ser. No. 497,639, filed May 24, 1983 to Winter et al. which is hereby incorporated by reference. By inserting the fiber or fibers 14 and any filler material 17 using the aforementioned technique, the length of each optical fiber 14 exceeds the length of the tube by less than about 1%. Further, it is believed that the magnitude of the forces required to insert the filler material 17 and the fiber or fibers 14 into the tube 30 may be reduced. By reducing these forces, the likelihood of damaging or kinking the optical fiber or fibers 14 during insertion is minimized.

Referring now to FIG. 10, an alternative embodiment of the core assembly apparatus 16' is illustrated. In this embodiment, the containment tube 30 is formed from a metal strip 12 preferably using the two-die technique described above. The tube 30 may be sealed using any of the aforementioned soldering approaches, preferably the meniscus solder approach. The embodiment of FIG. 10 does differ from the embodiment of FIG. 4 in that the fiber or fibers 14 and the filler material 17 are inserted into the tube 30 substantially simultaneously by the protective sheath 98. The protective sheath 98 preferably comprises a single passageway 100 having a pressure seal 102 with an inlet opening 104 at a first end. The optical fiber or fibers 14 enter the passageway 100 through the opening 104. On a sidewall of the passageway 100, preferably adjacent the seal 102, an inlet opening 106 is provided for supplying filler material 17 into the passageway 100. In a preferred arrangement, the pressure seal 102 and the inlet opening 106 are at a substantially right angle to each other. At the end of the passageway 100 opposed from pressure seal 102, an outlet opening 108 is provided. The passageway 100 extends a sufficient distance into the tube 30 that the fiber or fibers 14 and the filler material 17 are released into the tube 30 after the solder has solidified and the tube has been completely sealed.

As before, the filler material 17 is preferably inserted into the passageway 100 while under pressure. The fiber or fibers 14 are preferably inserted in the manner described above to place each one into static compression.

Since the filler material 17 is used to fill the tube 30, it should flow at a speed faster than the movement of the tube and the fiber or fibers. To improve its flowability, the filler material 17 may be inserted into the passageway 100 in a heated condition. However, the temperature of the filler material should not be so high that the fiber or fibers 14 are damaged.

In certain applications, it is not necessary to have a filler material surrounding the optical fiber or fibers within the core assembly. Referring now to FIG. 11, an apparatus 16" for assembling a cable core without a filler material is illustrated. The apparatus 16" is readily adaptable for assembling a cable core such as that shown in FIG. 16 having one or more optical fibers 14, each surrounded by a suitable buffer material 19, in a closely surrounding containment tube 30.

In the embodiment of FIG. 11, the containment tube 30 is formed from a metal strip 12 again preferably using the two-die technique described hereinbefore. The tube 30 may be sealed using any of the aforementioned soldering approaches, preferably the meniscus solder approach. The fiber or fibers 14 may be inserted or released into the tube 30 by protective sheath 110. The protective sheath 110 comprises a single passageway 112 having a seal 114 with an inlet opening 116 at a first end. The optical fiber or fibers 14 enter the passageway 112 through the opening 116. At the end of the passageway 112 opposed to the seal 114 is outlet opening 118. The passageway 112 extends a sufficient distance into the tube 30 that as the fiber or fibers 14 emerge from the opening 118, the fiber or fibers are released into the tube 30 after the solder has solidified and the tube 30 has been completely sealed. The protective sheath 110 minimizes the possibility of the sealing operation damaging the optical fiber or fibers.

While any suitable technique may be utilized, the fiber or fibers 14 are preferably inserted into the tube 30 as described in the aforementioned allowed co-pending patent application Ser. No. 497,639 to Winter et al. which has been incorporated by reference, without any significant tension being applied.

It is preferred that the protective sheaths 82, 98, and 110 be formed from a material having certain properties. First, the material should not be bondable to the metal or metal alloy forming tube 30. If the material were bondable, the sealing operation could bond the protective sheath to the tube 30. Second, the material should be able to withstand the temperatures associated with the sealing operation and, therefore, should have good high temperature properties. Finally, the material should have high strength characteristics and should have a relatively low thermal conductivity. By providing a material having a relatively low thermal conductivity, little or substantially none of the heat created during the sealing operation will be transmitted to the optical fiber or fibers and/or any filler material. Suitable materials out of which the protective sheath may be fabricated include refractory alloys such as high-nickel alloys, ceramic materials, high stainless steels, sapphire, insulating type materials and composites comprising an outer material having a relatively low thermal conductivity and an inner material having a higher thermal conductivity than the outer material. It should be recognized that the aforementioned materials are exemplary and should not be limiting in any way. Other suitable materials may be used.

In certain high temperature situations, it may be desirable to provide the protective sheath with a cooling arrangement. In this way, each optical fiber 14 and/or any filler material 17 may be additionally protected from heat generated during the sealing operation. Cooling could be provided in any suitable conventional manner. For example, the protective sheath could be connected to an external cooling apparatus 120. Cooling apparatus 120 may comprise any suitable conventional cooling apparatus known in the art. Cooling could be provided to any or each passageway of the protective sheath. In situations where it is desirable to provide cooling, it would be advantageous to form the protective sheath out of a composite material as discussed above. The higher thermally conductive inner material could be connected to the cooling apparatus while the outer material performs its protective function.

After the tube seam 24 has been soldered, it is desirable to pass the containment tube 30 through a means for promoting rapid solidification of the solder. In a preferred embodiment, immediately after soldering, the tube 30 is passed through either an air spray or a water quench 21.

After the cable core 11 containing the fiber or fibers 14 and a filler material 17, if needed, has been assembled, it may be passed through one or more surface preparation stations. These stations prepare the outer surface of the tube 30 so that at least one external layer may be readily fabricated about the core assembly. The surface preparation stations preferably include a degreasing station 23 and means 25 for removing any excess material from the outer periphery of tube 30.

Degreasing station 23 primarily removes any flux, filler material or other contaminant on the outer tube surface. Degreasing station 23 may be any suitable conventional degreasing system known in the art. Preferably, it is one that uses a non-etching cleaning solution to remove any flux, filler material, and/or other contaminant.

Referring now to FIG. 12, the means 25 for removing excess material preferably comprises a shaving die 122 similar to the strip shaving die 28. The shaving die 122 comprises an insert 124 mounted in a holder 126. The insert has a cylindrical bore 128 with a diameter equal to the desired outer diameter for the core assembly 11. The insert 124 may be formed from any suitable material, e.g. carbide and may be mounted in the holder 126 in any suitable manner known in the art. If desired, shaving die 122 may be provided with guide rollers not shown over which the core assembly 11 moves adjacent its entry and exit faces 130 and 132, respectively.

The shaving die 122 will remove any particles, such as lumps of solder, adhering to the outer tube surface and any excess solder from the seam seal. As a result, the shaving die 122 will improve the concentricity of the core assembly 11. By removing any particles adhering to the outer tube surface and any excess solder in the seam and by improving core assembly concentricity, it is possible to fabricate more concentric external layers each having a more uniform thickness. Being able to fabricate more concentric external layers is important if one is to manufacture a cable construction with substantially uniform mechanical and/or electrical properties throughout its cross section. Non-concentric external layers tend to have non-uniform thicknesses and non-uniform properties.

It has been discovered that particularly good results can be obtained if the shaving die 122 has a lead angle in the range of about 20° to about 30°, preferably about 26°, and the shaving face 134 has a length L that is greater than about twice the bore diameter d. Preferably, shaving face 134 has a length L that is from about three to about four times the diameter d. By using such a lead angle and shaving face length, gouging or digging out of the tube material should be substantially avoided.

Referring now to FIG. 13, yet another embodiment for sealing the containment tube 30 is illustrated. Although any of the protective sheaths described above may be used to protect the fiber or fibers 14 and a filler material 17, if needed, the protective sheath 110 is shown for the purposes of illustration. The tube 30 is formed as described hereinbefore. Instead of soldering the seam 24, the tube 30 is sealed by wrapping a solder-coated foil 136 about the tube 30 and heating the assembly to braze it. This sealing approach has the advantage of avoiding problems such as pinhole defects and seam cracks that are encountered by some seam soldering technqiues. In addition, the core assembly 11' formed using this approach is capable of withstanding the forces involved in the extrusion of high density polyethylene or other plastic coatings typically used in communication cables.

Although any suitable solder-coated foil may be used in this approach, it is preferred to use solder-coated copper foil. The copper foil should be a high purity copper foil and may be fabricated using any suitable technique known in the art. For example, the foil may be manufactured using either a metal rolling process or an electrodeposition process. Preferably, the copper foil is 1 oz./sq. ft. copper foil and has a width less than about 2 inches and a thickness in the range of about 0.005" to about 0.002". In a most preferred embodiment, the width of the foil is about 1 inch.

The copper foil may be coated with solder on one or more surfaces. Any suitable technique known in the art may be used to coat the foil surface or surfaces. For example, the foil may be coated using either a hot-dipping process or an electrodeposition process.

In a preferred method of performing this technique, the solder coated foil 136 is helically wrapped about the tube 30. The foil 136 may be wrapped about the tube using any conventional wrapping apparatus not shown known in the art. For example, the foil 136 may be taken off a supply reel not shown which is rotated about the advancing tube 30. The foil 136 should be wrapped so that some overlap between windings is created. The assembly is then heated to a temperature sufficient to melt the solder and agglomerate the entire assembly into a strong hermetic package. The heating technique utilized should be a rapid heating technique to minimize any risk of damaging the fiber or fibers 14. Any suitable rapid heating source 138 known in the art, such as an induction coil, a radiant heater or a furnace, may be used to heat the assembly 11'. In a preferred embodiment, a high frequency induction coil is used as the heat source 138. It is preferred to use a high frequency induction coil because the heat can be concentrated at the outer periphery of the assembly 11' thereby minimizing any risk of damaging the fiber or fibers 14.

In preparing the assembly 11' for the fabrication of one or more external layers, it is preferred that the shaving die 122 be omitted. If shaving die 122 were used, it could puncture the relatively thin foil 136 and thereby decrease the hermeticity of the assembly 11'. In using this sealing technique, other types of coated metal foil such as tin-coated copper foil could also be used.

The cable core assemblies 11 and 11' may contain any desired number of optical fibers 14. In a preferred embodiment, one to six optical fibers are located within the cable core assembly. Preferably, each optical fiber 14 comprises a photo-conductor glass rod; however, any suitable optical fiber with or without a buffer material around the optical fiber may be used in the cable. Where a buffer material surrounding the optical fiber substantially occupies the area within the containment tube, the filler material 17 may be omitted.

In addition to or in lieu of one or more of the fibers, the tube 30 may contain one or more electrical conductors such as a copper conductor not shown. The electrical conductor or conductors may be inserted in any suitable fashion.

Referring now to FIG. 14, after the cable core 11 or 11' has been assembled, it may be surrounded by one or more additional layers. For example, a dielectric layer 140 may be fabricated about the tube 30. A typical cable construction will have such a dielectric layer if the tube 30 is to be used as an electrical conductor. Dielectric layer 140 may be fabricated in any suitable conventional manner using any suitable conventional apparatus. For example, dielectric layer 140 may be extruded about the cable core by any suitable extruding arrangement 142 in a conventional manner. The dielectric layer 140 preferably comprises a high density polyethylene, although any suitable material may be used. If tube 30 is not used as an electrical conductor, the dielectric layer 140 may be omitted.

As shown in FIG. 14, the cable may be provided with a loadbearing layer 144. If a dielectric layer 140 is provided, the loadbearing layer 144 is preferably fabricated about it. The loadbearing layer serves as the primary tensile element in the cable, although some fraction of the total load is carried by the tube 30. This layer also acts as an abrasion-resistant layer which completely covers and protects the cable core 11 or 11'. Any suitable material such as polyethylene, polyamides, polyimides, epoxies, and other similar plastic materials may be used for the layer. In a preferred embodiment, this layer comprises a contrahelix of plastic filaments sold under the trademark KEVLAR by DuPont contained in a matrix of thermosetting epoxy. The fabrication of this layer may be done in a known manner by any suitable fabrication device 146, i.e. fabricating an annulus utilizing a die arrangement.

The cable is generally provided with an outer covering 148. The outer covering 148 serves as a barrier to water intrusion and defocuses external cutting or abrading forces. The outer covering 148 may be formed from any suitable material such as an elastomeric material. The outer covering 148 may be fabricated in any well known manner by any conventional apparatus 150 known in the art. For example, outer covering 148 may be extruded in a conventional manner by a conventional extrusion apparatus 150. In a preferred embodiment, covering 148 comprises a layer of black polyurethane. FIG. 15 shows an embodiment of a finally assembled cable 15.

While the optical fiber communication cable 15 has been shown as having a dielectric layer 140, a loadbearing layer 144 and an outer covering 148, any number of protective layers including another metallic type layer may be fabricated about the cable core 11 or 11'.

While any suitable technique may be used to deposit the fiber or fibers 14 into the tube 30, it is preferred to use the technique described in allowed co-pending patent application Ser. No. 497,639, filed May 24, 1983 to Winter et al. which is hereby incorporated by reference. Alternatively, if desired, the optical fiber or fibers 14 may be helically wound within the cable core 11 or 11'.

The filler material 17 may comprise any suitable non-setting void filler. The temperature to which the filler material is heated depends upon the selected filler and its viscosity characteristics. In a preferred embodiment, the filler material 17 comprises a gel which is initially introduced into its passageway at a temperature in the range of about 35° C. to about 150° C., preferably at about 100° C. A suitable filler which may be used for the filler material 17 is "PENRECO FW" made by Penreco of Butler, Pa.

The use of filler material 17 is highly desirable in a cable which may be subjected to high bending or hydrostatic stresses. The filler material 17 has two primary functions. First, it lubricates the fiber or fibers 14 to prevent stiction and microbending. Second, it provides the fiber or fibers 14 with a hydrostatic, ambient pressure environment.

If desired, the edges of the strip 26 may be shaped to form a mechanical interlock joint during the tube forming operation. The edges may be shaped in any conventional manner known in the art.

The material forming strip 12 and tube 30 should possess certain conductivity, strength, and diameter-to-thickness ratio characteristics. The material should possess a high electrical conductivity since tube 30 may act as an electrical conductor in the final cable. In the cable system, the tube 30 may be used to carry current between repeaters not shown which may be spaced about 25 km. apart.

Since tube 30 is preferably the only metal component in the cable, the material should possess high strength properties. The material preferably possesses significant yield strength and a relatively high yield strain. The tube 30 should be formed from a material that has a yield strength sufficient to keep the tube in a substantially elastic state for any degree of cable bending. By having a member that is maintained in a substantially elastic state and substantially never in a plastic state, the risk of breaking the glass fiber or fibers 14 due to placing the glass fiber or fibers 14 in tension is minimized. Additionally, the material should have good resistance to softening upon short-term exposure to elevated temperatures so that it will not lose significant strength during the sealing operation.

A material having a relatively high yield strain is important since it reduces the overall cable diameter. The yield strain of the material forming the containment tube 30 also determines how much of the ultimate strength of an outer loadbearing layer can be used without permanently straining the containment tube 30 and breaking the optical fiber or fibers 14. As used herein, the yield strain is the strain at the yield strength at 0.2% offset.

The material used to produce containment tube 30 should also be capable of sustaining certain coiling forces during fabrication and installation. Therefore, a diameter-to-thickness ratio which indicates good formability characteristics is required. If the material does not possess good formability characteristics, the containment tube wall may be crinkled or buckled during tube formation. If this occurs on the inner surface of the tube, the optical fiber or fibers may suffer microbending against angular surfaces and large increases in attenuation may result.

A preferred strip material has a conductivity in the range of about 25 to 102% IACS, a yield strength in the range of about 30 to about 90 ksi, preferably in the range of about 50 ksi to about 60 ksi, a yield strain less than about 1%, preferably in the range of about 0.3% to about 0.95% and a diameter-to-thickness ratio of about 5:1 to about 25:1, preferably from about 10:1 to about 20:1. A number of metals and alloys possess the required combination of strength, conductivity, and diameter-to-thickness ratio and may, therefore, be utilized. In a preferred embodiment, the material forming strip 12 and containment tube 30 comprise a copper/zirconium alloy designated Copper Alloy 151. Copper Alloy 151 has a conductivity of about 95% IACS, a yield strength of about 62 ksi, and a yield strain of about 0.36%.

Suitable copper alloys in accordance with this invention having the requisite strength and softening resistance comprise alloys drawn from the following systems: copper-zirconium, copper-chromium, copper-iron, copper-silver, copper-magnesium-phosphorus, copper-nickel-silicon, etc. Generally, in such copper alloy systems copper is present in an amount of at least about 95% and represents the balance of the alloy. The alloying elements may be selected from the group consisting of zirconium, chromium, iron, magnesium, phosphorus, nickel, silicon, tin and silver as well as combinations thereof. For applications where a moderate strength level and a conductivity greater than about 50% IACS are needed, the alloying elements should preferably be present in an effective amount to provide the desired strength and softening resistance up to about 5% by weight of the alloy and most preferably in such an effective amount up to about 3% by weight of the alloy.

In addition to the previously described Alloy 151, other suitable materials include Alloys 155, 19400 and 19500. In addition other high strength copper alloys such as CDA Alloys 63800 and 65400 can be used for very high strength applications. Alloy 63800 includes aluminum, silicon and cobalt within the aforenoted range while Alloy 65400 includes silicon, tin and chromium also within that range. In accordance with this invention, the metal tube should preferably be formed from a material having a minimum of 45 ksi tensile strength at 400° F. in order to be properly processable in accordance with this invention which involves heating the tubing during soldering while it is maintained under high tension.

While any suitable solder may be used to seal the tube 30, it has been found that when a fabrication technique for forming one or more of the additional layers about cable core 11 or 11' uses high temperatures, it is desirable to use a high temperature solder such as a silver solder.

The optical fiber communication cable generated by the instant invention theoretically can have a substantially infinite length. Cable lengths of about 25 km. between repeaters can be fabricated by the instant process and apparatus.

The optical fiber communication cable assembled by the instant invention may have any desired diameter; however, the instant invention is particularly suited for assembling a cable having a relatively small diameter. The containment tube 30 may have any desired inner and outer diameters. For example, it may have an inner diameter in the range of about 0.17 cm to about 0.25 cm and an outer diameter of about 0.24 cm to about 0.35 cm. In a preferred embodiment, where the containment tube 30 is made from Copper Alloy 151, the inner diameter of tube 30 is about 0.1823 cm and the outer diameter of tube 30 is about 0.2604 cm. The overall diameter of the cable produced by the instant invention may be in the range of about 0.821 cm to about 0.977 cm. In a preferred embodiment having a containment tube of Copper Alloy 151, the overall cable diameter is about 0.9267 cm.

Assembling an optical fiber communication cable in accordance with the method of the instant invention has several advantages. First, the optical fiber or fibers and any filler material may be inserted into the containment tube at reduced pressure thereby reducing the likelihood of breaking, kinking, or damaging the optical fiber or fibers. Second, the containment tube can be provided with an effective seal having a high degree of hermeticity. Third, the containment tube can be formed so that it has a relatively small diameter, thereby reducing the overall cable diameter.

The cable produced by the instant invention can be used in both underground, aboveground, and undersea communication applications. For example, it could be used to supply data support and power to a deep sea sensor. It could also be used for underground, aboveground, and undersea telephone applications.

While the containment tube has been described in a preferred embodiment as being formed from Copper Alloy 151, it may be formed from any metal or metal alloy exhibiting the desired conductivity, strength, and formability characteristics.

While the first embodiment of the protective sheath 82 for releasing the filler material 17 and the fiber or fibers 14 into the containment tube 30 has been shown as having concentric passageways 84 and 86, respectively, with different lengths, the protective sheath 82 may be modified so that the concentric passageways 84 and 86 have substantially the same length and substantially simultaneously release the filler material 17 and the fiber or fibers 14 into the containment tube 30. In addition, the protective sheath 82 may be modified if desired so that the passageways 84 and 86 are non-concentric. Furthermore, the passageway or passageways of the Various protective sheath embodiments 82, 98 and 110 may have any desired cross-sectional shape and any desired longitudinal configuration and extent.

While the invention has been exemplified with respect to the use of a die for forming open tube section 56, if desired, roll forming could be employed to form the open tube section. The final forming of the tube section into the tube, however, should be by die forming as described.

The U.S. patents and patent applications, publications and papers set forth in this application are intended to be incorporated by reference herein.

It is apparent that there has been provided in accordance with this invention a novel process and apparatus for fabricating optical fiber communication cables which fully satisfy the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A process for fabricating an optical fiber cable assembly having at least one optical fiber housed within a sealed metal or metal alloy tube, said process comprising:
   forming a metal or metal alloy strip into a tube having a seam formed by spaced-apart tube portions;
   inserting said at least one optical fiber within said tube;
   sealing said seam and said tube;
   said sealing step comprising providing a bath of molten metallic sealing material having a composition different from that of said metal or metal alloy forming said tube, said bath having an inlet through which said tube and said at least one fiber enter said bath and an outlet through which said tube and said at least one fiber exit said bath;
   said sealing step further comprising pulling said tube with said at least one fiber through said bath of molten metallic sealing material without any protective structure between said tube and said bath to permit said tube to be in contact with said molten metallic sealing material as it travels from said inlet to said outlet and to permit the motion of said tube through said bath to cause said molten sealing material to flow into said seam and seal said tube and to form a coating about said tube; and
   rapidly solidifying said sealing material after said tube exits said bath by passing said tube through a water quench.

2. The process of claim 1 wherein said tube forming step comprises pulling said metal or metal alloy strip through at least one tube forming die.

3. The process of claim 2 further comprising:

applying a flux to said metal or metal alloy strip prior to said tube forming step.

4. The process of claim 1 further comprising:
said pulling step forming a coating of said sealing material about the outer periphery of said tube.

5. The process of claim 1 further comprising:
fabricating at least one non-metallic layer about said tube.

6. The process of claim 1 further comprising:
said molten metallic sealing material having a transverse dimension substantially greater than the outer diameter of said tube.

7. The process of claim 1 wherein:
the step of forming said tube comprises forming a copper or copper alloy strip into said tube; and
the step of sealing said seam and tube comprises providing a bath of molten tin-containing material and pulling said tube through said molten tin-containing material bath.

8. A process for fabricating an optical fiber cable assembly having at least one optical fiber housed within a sealed metal or metal alloy tube, said process comprising:
providing a metal or metal alloy strip;
applying a flux to said strip;
forming said strip into a tube characterized by a seam formed by spaced-apart tube portions;
said tube forming step including providing at least one tube forming die and pulling said strip through said at least one tube forming die;
inserting said at least one optical fiber within said forming tube;
providing a bath of molten metallic sealing material having a composition different than that of said metal or metal alloy forming said tube, said bath having an inlet through which said tube and said at least one optical fiber enter said bath and an outlet through which said tube and said at least one optical fiber exit said bath;
pulling said tube with said at least one fiber through said bath of molten metallic sealing material without any protective structure between said tube and said bath, said tube being in contact with said molten metallic sealing material as it travels from said inlet to said outlet and the motion of said tube through said bath causing said molten sealing material to flow into said seam and seal said tube; and
rapidly solidifying said sealing material after said tube exits said bath by passing said tube through a water quench.

9. An apparatus for fabricating an optical fiber cable assembly having at least one optical fiber housed within a sealed metal or metal alloy tube, said apparatus comprising:
means for forming a metal or metal alloy strip into a tube characterized by a seam formed by spaced-apart tube portions;
means for inserting said at least one optical fiber within said tube;
means for sealing said seam and forming a coating about substantially the entire periphery of said tube, said sealing means comprising a bath of molten metallic sealing material having a composition different than that of said metal or metal alloy;
said bath having an inlet through which said tube and said at least optical fiber enter said bath and an outlet through which said tube and said at least one optical fiber exit said bath;
the outer periphery of said tube being in contact with said molten sealing material from said inlet to said outlet;
means for pulling said tube and said fiber through said bath without any protective structure surrounding said tube as said tube travels through said bath; and
means for rapidly solidifying said sealing material with a water quench after said tube exits said bath, whereby said motion of said tube being pulled through said bath causes said molten sealing material to flow into and substantially fill said seam and form said coating.

10. The apparatus of claim 9 wherein:
said tube forming means comprises at least one tube forming die and means for pulling said metal or metal alloy strip through said at least one die.

11. The apparatus of claim 10 further comprising:
means for applying a flux to said strip prior to said strip being pulled through said at least one die.

12. The apparatus of claim 9 further comprising:
means for fabricating at least one non-metallic layer about said tube.

13. The apparatus of claim 9 further comprising said molten sealing material in said bath having a transverse dimension substantially greater than the outer diameter of said tube.

14. The apparatus of claim 9 further comprising:
said metal or metal alloy strip being formed from copper or a copper base alloy; and
said sealing material being formed from a tin-base material.

15. An apparatus for fabricating an optical fiber cable assembly having at least one optical fiber housed within a sealed metal or metal alloy tube, said apparatus comprising:
means for forming a strip of metal or metal alloy into a tube characterized by a seam formed by spaced-apart tube portions;
said forming means comprising at least one tube forming die and means for pulling said metal or metal alloy strip through said at least one die;
means for applying a flux to said strip prior to said strip being pulled through said at least one die;
means for inserting said at least one optical fiber within said tube;
means for sealing said seam and forming a coating about substantially the entire periphery of said tube;
said sealing means comprising a bath of molten metallic sealing material;
said bath having an inlet through which said tube and said at least one optical fiber enter said bath and an outlet through which said tube and said at least one optical fiber cable exit said bath;
the outer periphery of said tube being in contact with said molten sealing material from said inlet to said outlet;
means for pulling said tube with said fiber through said bath without any protective structure surrounding said tube as said tube travels through said bath; and
means for rapidly solidifying said sealing material with a water quench after said tube exits said bath, whereby said motion of said tube being pulled through said bath causes said molten sealing material to flow into and substantially fill said seam and form said coating.

* * * * *